(12) United States Patent
Kaidalov et al.

(10) Patent No.: US 8,097,053 B2
(45) Date of Patent: Jan. 17, 2012

(54) SEPARATOR OF SOLID PARTICLES FROM STEAM-GAS MIXTURE

(75) Inventors: Aleksandr Kaidalov, Auvere Küla (EE); Boriss Kindorkin, Auvere Küla (EE)

(73) Assignee: Eesti Energia Olitoostus AS, Ida-Virumaa (EE)

( * ) Notice: Subject to any disclaimer, the term of this patent is extended or adjusted under 35 U.S.C. 154(b) by 0 days.

(21) Appl. No.: 12/676,561

(22) PCT Filed: Sep. 4, 2008

(86) PCT No.: PCT/EE2008/000021
§ 371 (c)(1),
(2), (4) Date: Mar. 4, 2010

(87) PCT Pub. No.: WO2009/030241
PCT Pub. Date: Mar. 12, 2009

(65) Prior Publication Data
US 2010/0180557 A1   Jul. 22, 2010

(30) Foreign Application Priority Data
Sep. 5, 2007   (EE) .................................. 200700049

(51) Int. Cl.
   *B01D 45/12*        (2006.01)
(52) U.S. Cl. ................. 55/345; 55/435; 55/416; 55/413; 55/414; 55/434.1
(58) Field of Classification Search ............ 55/345, 55/435, 416, 413, 414, 434.1
See application file for complete search history.

(56) References Cited

U.S. PATENT DOCUMENTS

| | | | | |
|---|---|---|---|---|
| 2,207,150 A | * | 7/1940 | Hirsch et al. | 92/255 |
| 2,421,664 A | * | 6/1947 | Tyson | 208/161 |
| 3,235,239 A | * | 2/1966 | Petersen | 106/750 |
| 3,470,678 A | * | 10/1969 | Schumacher et al. | 55/434.1 |
| 3,724,176 A | * | 4/1973 | Vishnevsky et al. | 55/342.2 |
| 4,055,486 A | | 10/1977 | Choi et al. | |
| 4,217,834 A | * | 8/1980 | Pearce | 110/165 R |
| 4,328,008 A | * | 5/1982 | Muenger et al. | 48/197 R |
| 4,416,672 A | * | 11/1983 | Underwood | 96/213 |

(Continued)

FOREIGN PATENT DOCUMENTS
DE        27 36 493 A1        2/1979
(Continued)

*Primary Examiner* — Jason M Greene
*Assistant Examiner* — Dung H Bui
(74) *Attorney, Agent, or Firm* — Birch, Stewart, Kolasch & Birch, LLP

(57) ABSTRACT

The present invention is related to the separator (dust chamber) for separating solid particles from vapor-gas mixture, particularly to the structure of the dust chamber belonging amongst installation of the plant processing the fossil fuels or materials containing organic matter. The dust chamber (1) for separating solid particles from vapor-gas mixture comprises main body (2) with inner refractory lining (7) arranged to the inner surface of said main body, first and second stage cyclones (3, 4), lamella compensators (18, 19), dust removal conduits (5, 15) and inlet conduit (13) of the vapor-gas mixture into the first cyclone (3). The main body (2) of the dust chamber (1) is manufactured in all height from the cylinder of equal diameter and first and second stage cyclones (3, 4) are placed outside of the main body (2) of the dust chamber (1). For the refractory lining of the main body (2) of the dust chamber (1) and first and second stage cyclones (3, 4) the non-porous and wear proof material, for example concrete, is used.

7 Claims, 3 Drawing Sheets

U.S. PATENT DOCUMENTS

| | | | |
|---|---|---|---|
| 4,479,817 A * | 10/1984 | Steever et al. | 55/434.1 |
| 4,483,692 A * | 11/1984 | Patel | 48/210 |
| 4,505,051 A * | 3/1985 | Herchenbach et al. | 34/594 |
| 4,547,341 A * | 10/1985 | Weber | 422/147 |
| 4,581,163 A * | 4/1986 | Meininger et al. | 588/3 |
| 4,711,186 A * | 12/1987 | Chen et al. | 110/336 |
| 4,904,281 A * | 2/1990 | Raterman | 95/271 |
| 4,961,761 A * | 10/1990 | Johnson | 55/434.4 |
| 5,116,394 A * | 5/1992 | Garkawe | 55/434.4 |
| 5,868,809 A * | 2/1999 | Heard | 55/337 |
| 6,267,803 B1 * | 7/2001 | Escobar et al. | 95/271 |
| 6,540,918 B2 * | 4/2003 | Gil et al. | 210/512.1 |
| 6,686,752 B1 * | 2/2004 | Heumann et al. | 324/700 |
| 6,814,940 B1 * | 11/2004 | Hiltunen et al. | 422/141 |
| 6,837,913 B2 * | 1/2005 | Schilling et al. | 55/435 |
| 6,923,940 B2 * | 8/2005 | Benham | 422/147 |
| 6,938,780 B2 * | 9/2005 | Baglione et al. | 209/717 |
| 6,979,360 B1 * | 12/2005 | Cetinkaya et al. | 95/271 |
| 7,550,021 B2 * | 6/2009 | Witter | 55/295 |
| 2003/0150325 A1 * | 8/2003 | Hyppanen | 95/271 |
| 2004/0234794 A1 * | 11/2004 | Schadenberg et al. | 428/467 |
| 2004/0237484 A1 * | 12/2004 | Altvater et al. | 55/345 |
| 2006/0150588 A1 * | 7/2006 | Ivarsson | 55/345 |
| 2008/0134892 A1 * | 6/2008 | Claude | 95/271 |
| 2010/0139306 A1 * | 6/2010 | Krenik | 62/402 |

FOREIGN PATENT DOCUMENTS

| | | |
|---|---|---|
| EE | 200100111 A | 10/2001 |
| EP | 0 413 599 A1 | 2/1991 |
| EP | 1 318 186 A1 | 6/2003 |
| GB | 1 533 022 A | 11/1978 |
| WO | WO 99/25469 A1 | 5/1999 |
| WO | WO 01/58568 A1 | 8/2001 |
| WO | WO 2004/108861 A1 | 12/2004 |

* cited by examiner

SEPARATOR OF SOLID PARTICLES FROM STEAM-GAS MIXTURE

TECHNICAL FIELD

The present invention is related to the separator (dust chamber) for separating solid particles from vapour-gas mixture, particularly to the structure of the dust chamber belonging amongst installation of the plant processing the materials containing the fossil fuels or organic substances.

BACKGROUND ART

As regards to state of the art, the separator (dust chamber) for separating solid particles from vapour-gas mixture known and used by patent applicant is described as follows with reference to FIG. 1. In order to get a clearer and better view of the device known from state of the art, and also to draw out differences with this invention, details of the separator that correspond to those known from the state of the art are marked with the same position numbers, adding an apostrophe (') to position number in order to differentiate between the two.

The separator (dust chamber) for separating solid particles from vapour-gas mixture known from state of the art 1' comprises of cylindrical enclosures of various diameters 2', 2" with inner refractory lining, which are connected by transition cone 20, first and second stage cyclones 3', 4', dust removal conduits 5', vapour-gas mixture from inlet vent 13' on first cyclone 3' and vapour-gas mixture containing semi-coke particles from inlet vent 9' to main body.

This structure has several shortcomings that decrease the cleaning efficiency and cause equipment failures.

In this device, the physical settling of semi-coke from vapour-gas mixture is performed by gravity, which, proceeding from the structure of device, causes:

- in the cylindrical part of the main body (for example, a decrease of diameter from about 6.5 m to about 3.96 m) gravitational settling of semi-coke from vapour-gas mixture causes a heavy semi-coke sediment on the surface of transition cone 20, which slowly decreases the diameter of transition cone 20. This in turn hinders the purposeful work of the dust chamber, i.e. the gravitational settling of semi-coke decreases, because the speed of vapour-gas mixture going through main body accelerates so that semi-coke particles are carried through by vapour-gas mixture, i.e. the removal speed of semi-coke particles is higher than the gravitational settling speed of particles. Decrease in gravitational settling results in unwanted increase in semi-coke concentration in vapour-gas mixture exiting from second cyclone 4'.
- internal two-layer refractory lining 7' of dust chamber is made of firebricks with high porosity and cracks, and therefore has several shortcomings. The pores and cracks in firebricks cause vapour-gas mixture infiltration through thermal insulation, e.g. bricks located behind firebricks, which cause hydrocarbon vapour in vapour-gas mixture to condense on the internal metal wall of dust chamber main body. This contravenes with the objective of refractory lining and insulation, because the material used for refractory lining loses its thermal insulation properties. Decrease in thermal insulation causes semi-coke to stick on internal walls of refractory lining.
- design of dust chamber for cleaning vapour-gas mixture from semi-coke particles includes cyclones 3', 4', which are placed inside dust chamber. Due to this kind of placement and the type of the second cyclone 4', the dust chamber known from state of the art has several deficiencies:
  - in treatment process, cyclones 3', 4', are filled with semi-coke deposits, which in turn causes the cyclones and the main metal bodies of their bins to heat up,
  - due to large dimensions, rigid fixation and thermal expansion, the cyclones placed inside dust chamber need large diameter lamella compensators 17 that are placed in the joint between bin and cyclone. Since this location is most subjected to semi-coke removal, it will cause breakdown of lamella compensators and following leakage. This in turn causes the stoppage of cyclone-operations for repairs. This deficiency is also present in gas conduit having between first and second cyclone the lamella compensator 18'.
  - the inlet conduit 13' of first cyclone 3' is located horizontally, during the operation, starting and stopping the inlet conduit tends to collect semi-coke residue, which results in decrease in cyclone efficiency.
  - due to high speeds of vapour-gas mixture in cyclones, those cyclones are subject to high abrasive wear, which causes a decrease in the thickness of the walls of a cyclone's main body. Also, due to the fact that they are located inside a dust chamber, it is not possible to carry out cyclone wall thickness measurements at any given point, and an excessive wear of cyclone wall will stop the whole machine.
  - Second cyclone has a very high pressure drop.
- large amounts of deposited semi-coke (150 m$^3$), proceeding from above listed deficiencies, cause a longer time spent on maintenance and repairs.

DISCLOSURE OF THE INVENTION

For increase in efficiency and reliability, as well as decrease in preparation time for repairs, this invention offers to:

- change dust chamber construction by removing the transition cone between the cylinders with various diameters of dust chamber's main body, i.e. dust chamber is fully built with the same diameter; this prevents settling of semi-coke on the cone surfaces of dust chamber's main body. Which is the reason for the increase in concentration of semi-coke particles in vapour-gas mixture from second stage cyclone during the operation of dust chamber, and this ensures that the product quality remains constant during operation.
- porous material, used in the refractory lining of dust chamber, is changed to non-porous, for example concrete. This prevents vapour-gas mixture from infiltration through the refractory lining and the formation of unwanted condensate on the internal metal wall of dust chamber.
- the design with internally placed cyclones is changed to externally placed cyclones, adding also external thermal insulation to cyclones. This external design excludes need to use lamella compensators between cyclone main body and dust collector. Also, such cyclone structure ensures a short repairs time and the opportunity to measure the thickness of cyclone main body walls constantly.
- to decrease cyclones' abrasive wear, wear-proof refractory lining, e.g. concrete is placed on the internal surfaces of cyclones.
- to increase the productivity of vapour-gas mixture without decreasing the efficiency of cleaning of vapour-gas mixture, the second stage cyclone is replaced by a cyclone with a lower pressure drop, which enables to decrease the hydraulic resistance of the whole ash treatment facility.

BRIEF DESCRIPTION OF DRAWINGS

The dust chamber for separating solid particles from vapour-gas mixture that corresponds to this invention is described extensively, but not restrictively, in following implementation example with references to annexed figures, where.

DESCRIPTION OF EMBODIMENTS

A device in which the pyrolysis of pulverized fossil fuel (e.g. oil shale) or material containing organic matter using solid heat-carrier process takes place, includes the separator (dust chamber) for separating solid particles from vapour-gas mixture. The temperature of vapour-gas mixture entering into treatment junction is about 480° C. and it contains particles of semi-coke up to 230 g/m3, the rest is hydrocarbon vapours, water vapour and pyrolysis gas and other admixtures and gases.

Vapour-gas mixture is purified in this device by the gravitational settling of particles.

Figure 1:
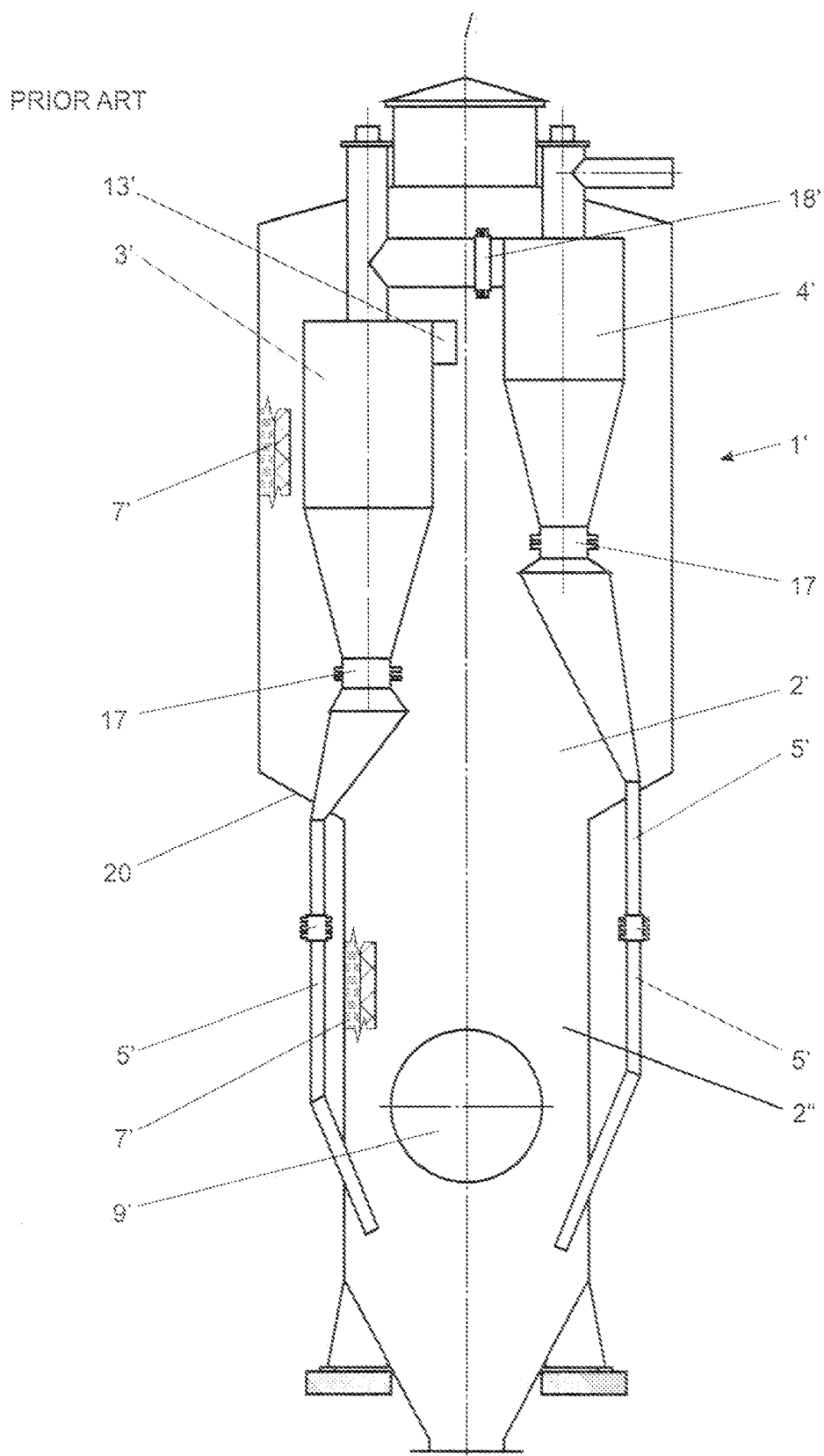
FIG. 1 shows the design of dust chamber known as state of the art.
Figure 2:
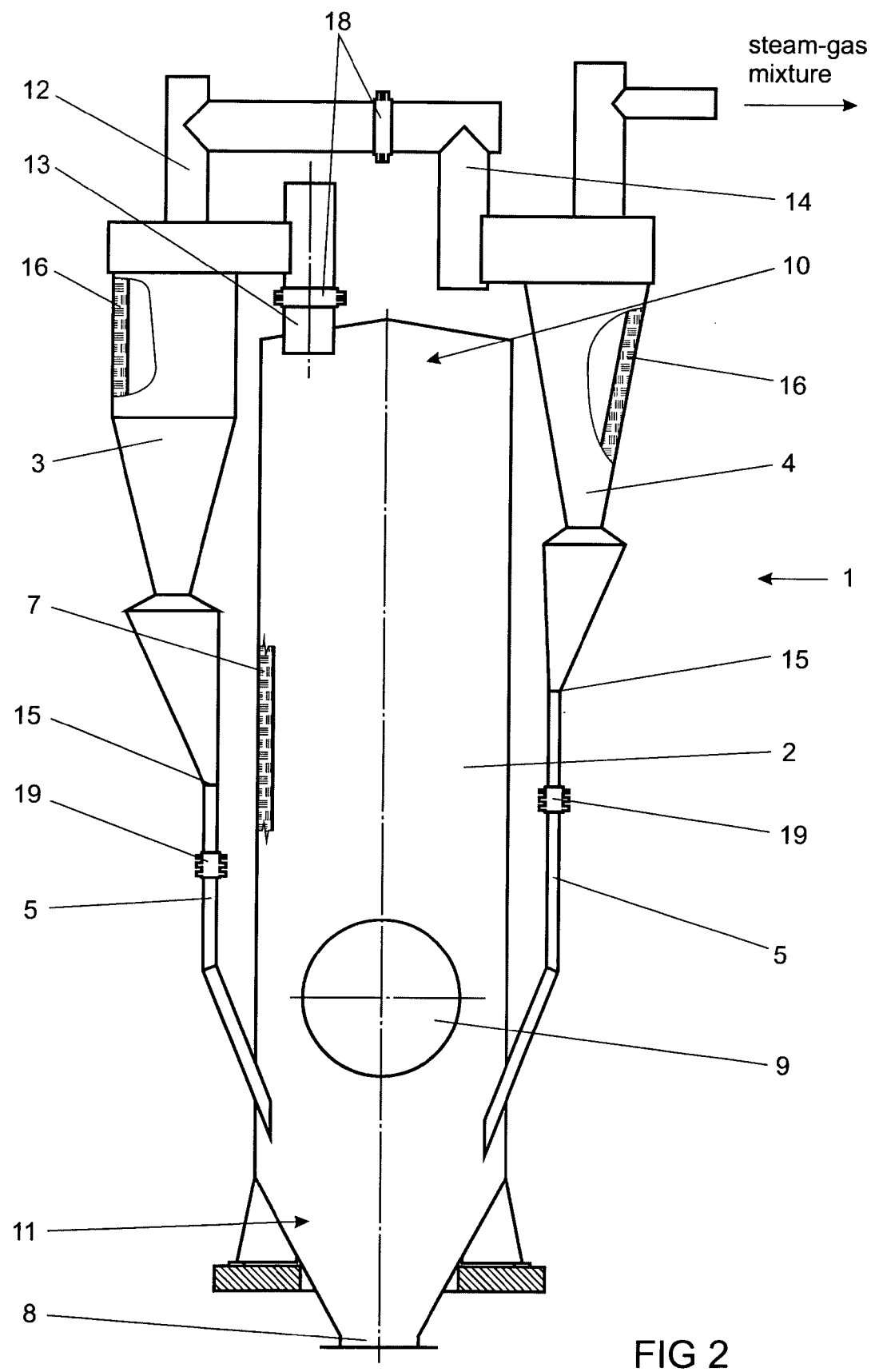
FIG. 2 shows the design of the dust chamber according to the present invention.

The separator for separating solid particles from vapour-gas mixture or dust chamber 1 according to the present invention illustrated in the FIG. 2 comprises the main body 2, which internal surface is covered with internal refractory lining 7. Internal refractory lining 7 is made from wear-proof and non-porous material like concrete, so that vapour-gas mixture cannot leak through and the hydrocarbon vapours cannot condense between refractory lining 7 and the internal metal surface of the main body 2 of dust chamber 1. The main body 2 of dust chamber 1 is cylindrical and its diameter is the same throughout its whole height, e.g. usually the main bodies of about 3-9 m in diameter are used. Inlet vent 9 for vapour-gas mixture containing semi-coke particles is located on one side of the lower part of the main body 2 of dust chamber 1. Outlet vent 8 for semi-coke particles is on the lower end 11 of the main body 2 of dust chamber 1.

The first and second stage cyclones 3, 4 are located outside the main body 2 of dust chamber. The inlet conduit 13 of first stage cyclone 3 is connected to the upper end 10 of the main body 2 of dust chamber, whereas inlet conduit 13 is vertical and parallel to vertical axis of dust chamber 1. The outlet vent of 12 of the first stage cyclone 3 is connected to the inlet conduit 14 of second stage cyclone 4. To compensate for stress, lamella compensators 18 have been added to above listed connections, to the inlet conduit 13 of first stage cyclone 3 and on the conduit connecting first and second stage cyclones 3, 4 accordingly. Semi-coke outlet vents 15 are located on the lower part of first and second stage cyclones 3, 4, and are connected by dust channels 5 to the lower part of main body 2 of dust chamber so that dust channels 5 run to the semi-coke particles' outlet vent 8 located in main body of dust chamber 1. Additionally, small diameter lamella compensators 19 have been added to dust channels 5 in order to compensate for stress.

The internal surface of first and second stage cyclones 3, 4, is lined with wear-proof material 16, e.g. concrete, and since they are not inside of the main body 2 of dust chamber 1, it is possible to measure the wall thickness for cyclones 3, 4 and make repairs when necessary.

Figure 3:
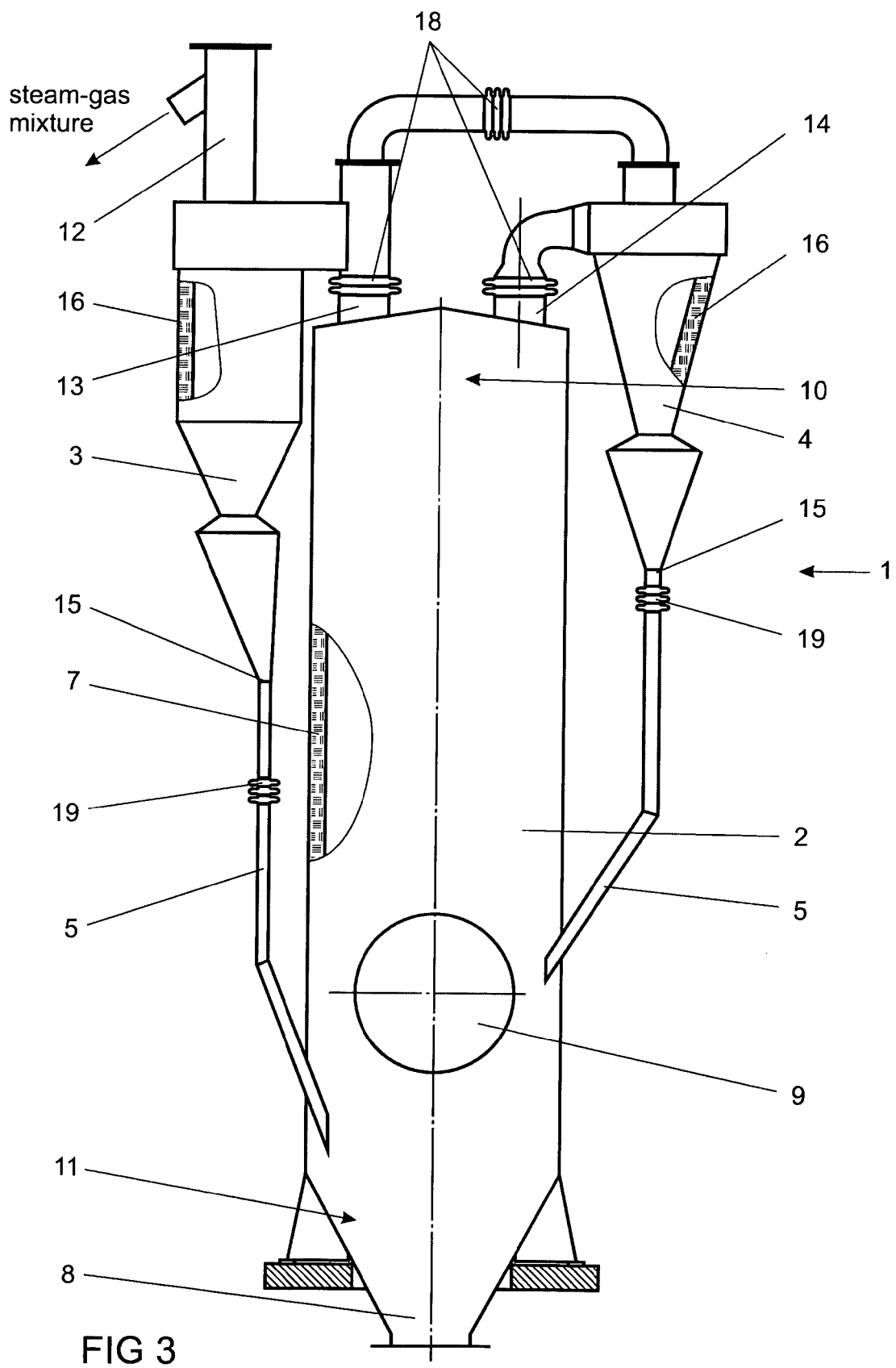
FIG. 3 shows the alternative design of dust chamber according to the present invention.

In the alternative embodiment of the dust chamber according to the present invention described in FIG. 3, the corresponding inlet conduits 13, 14 for first and second stage cyclones 3, 4 are connected to the upper end 10 of the main body of dust chamber. The outlet conduit of second stage cyclone 4 is connected to the inlet conduit of the first stage cyclone 3 so that the vapour-gas mixture containing semi-coke particles is directed parallel to both cyclones 3, 4 and the vapour gas mixture exiting from second stage cyclone 4 is directed to the first stage cyclone 3. A lamella compensator 18 has also been installed between outlet pip of second stage cyclone 4 and the inlet conduit of first stage cyclone 3 to compensate for stress. The vapour-gas mixture purified from semi-coke particles is directed from first stage cyclone 3 through outlet vent 12 for further treatment. Such placement of centrifugal cyclones allows the parallel operation of cyclones 3, 4 and in case there are failures in one cyclones operation, the purification of vapour-gas mixture continues in another cyclone.

The operation of a plant for thermal treatment of fossil fuels and materials containing organic matter, primarily in a device in which a pyrolysis of pulverized material with solid heat carrier process produces vapour-gas mixture which has to be purified from semi-coke particles. A dust chamber 1 is used for separating solid particles from vapour-gas mixture, which has main body 2 and cyclones 3, 4. To achieve that, vapour-gas mixture containing semi-coke particles is directed to the main body 2 of dust chamber 1, where gravity forces enforce heavier semi-coke particles to settle in the lower part 11 of main body 2 of dust chamber 1, vapour-gas mixture with lighter semi-coke particles is directed through the inlet conduit 13 located in the upper end of the main body 2 of dust chamber to first stage cyclone 3, where centrifugal forces help to remove the remaining semi-coke particles. For complete purification of vapour-gas mixture, it is directed from the first stage cyclone 3 to the second stage cyclone 4, where the final purification of vapour-gas mixture from semi-coke particles occurs. After that the cleaned vapour-gas mixture is directed from the second stage cyclone 4 to further treatment.

The design of dust chamber for separating solid particles from vapour-gas mixture according to this invention allows performing repairs quickly and without stopping the whole production cycle for a longer period. It should be clear for experts of this field that the dust chamber corresponding to this invention is not restricted to implementation example as provided above, but the protection range of the invention should take into account that are described in annexed claims, features and also their combinations of the same nature.

The invention claimed is:

1. A separator or dust chamber (1) for oil shale separation, the separator comprising a main body (2) with an internal refractory lining (7) placed on an internal side-surface of said main body, a first stage cyclone (3), a second stage cyclone (4), lamella compensators (18, 19), dust removal conduits (5, 15), an inlet conduit for vapour-gas mixture (13) to first stage cyclone (3), and an inlet vent (9) in the main body (2) of the dust chamber (1) for the vapour-gas mixture, wherein the vapour-gas mixture contains semi-coke particles, wherein a diameter of a cylinder of the main body (2) of the dust chamber is uniform in its full height, with its lower end (11) having an outlet vent (8) for the removal of semi-coke particles, wherein said inlet vent (9) is located above the outlet vent (8) on a side of the main body (2) of the dust chamber (1), wherein the first and second stage cyclones (3, 4) are located outside the main body (2) of the dust chamber (1), and wherein the internal refractory lining (7) of the main body (2) of the dust chamber (1) comprises a wear-proof and non-porous thermal insulation material.

2. The separator for oil shale separation according to claim 1 wherein said vapour-gas mixture inlet conduit (13) to first stage cyclone (3) is located vertically on an upper end (10) of said main body (2) of the dust chamber (1), so that its axis is on the same direction and parallel to a vertical axis of the main body (2) of the dust chamber.

3. The separator for oil shale separation according to claim 1 wherein the wear-proof and non-porous thermal insulation material is concrete.

4. The separator for oil shale separation according to claim 1 wherein said first and second stage cyclones (3, 4) are connected by dust channels (5) with the lower end (11) of said main body (2) of the dust chamber (1), whereas dust channels (5) are directed above the outlet vent (8) located in said main body (2) of the dust chamber (1).

5. The separator for oil shale separation according to claim 1 wherein said second stage cyclone (4) has a lower hydraulic resistance.

6. The separator for oil shale separation according to claim 1 wherein an internal surface of first and second stage cyclones (3, 4) is lined with a wear-proof material (16).

7. The separator for oil shale separation according to claim 6 wherein said wear-proof material (16) used for the internal surface of first and second stage cyclones (3, 4) is concrete.

\* \* \* \* \*